July 28, 1925.
A. P. CRELL
BUMPER FOR VEHICLES
Filed March 12, 1925
1,547,793
2 Sheets-Sheet 1
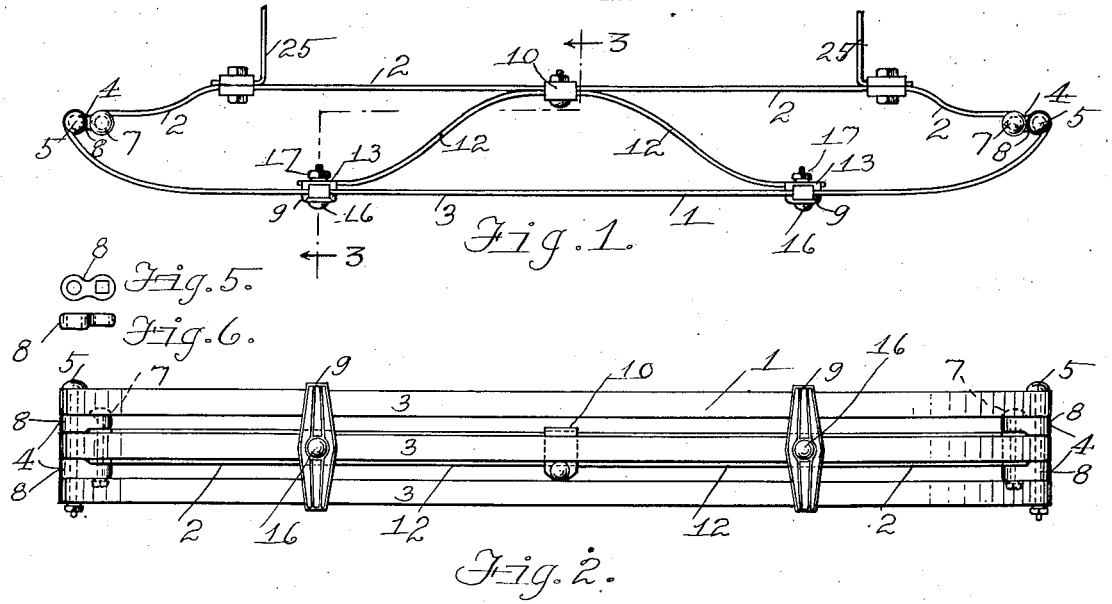
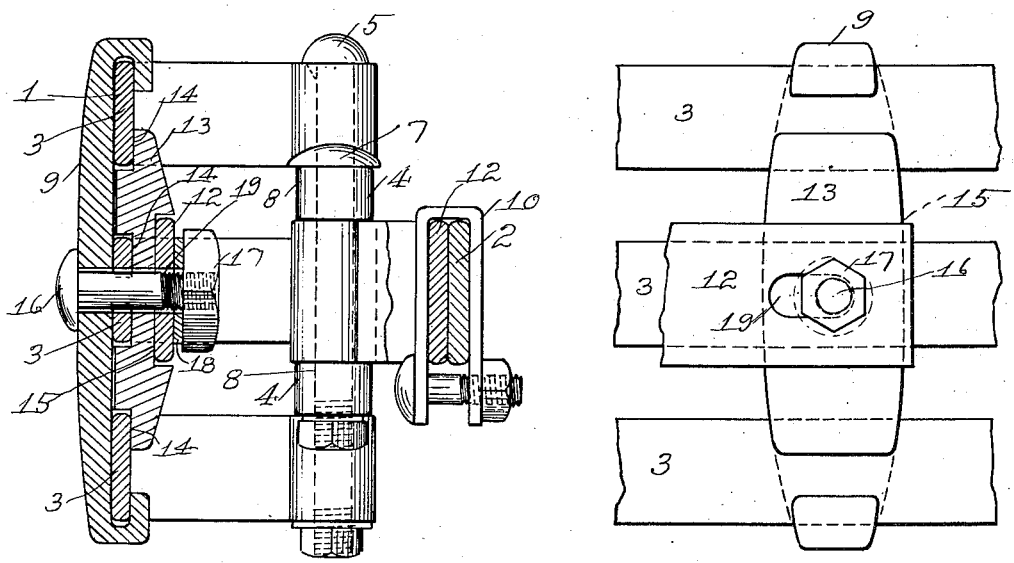
INVENTOR.
Albert P. Crell
BY
Cyrus W. Rice
ATTORNEY.

Patented July 28, 1925.

1,547,793

UNITED STATES PATENT OFFICE.

ALBERT P. CRELL, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

BUMPER FOR VEHICLES.

Application filed March 12, 1925. Serial No. 14,877.

*To all whom it may concern:*

Be it known that I, ALBERT P. CRELL, a citizen of the United States, residing at Grand Rapids, in the county of Kent and State of Michigan, have invented new and useful Improvements in Bumpers for Vehicles, of which the following is a specification.

The present invention relates to bumpers for vehicles; and its object is, generally, to provide an improved device of that character whereby the vehicle may be protected from injuries which might otherwise result from contact with extraneous objects.

This and any other and more specific objects hereinafter appearing are attained by, and the invention finds preferable embodiment in, the structure hereinafter particularly described in the body of this specification and illustrated by the accompanying drawings, in which:—

Figure 1 is a top plan view of a bumper for vehicles, with supporting or mounting means therefor;

Figure 2 is a face view thereof;

Figure 3 is a transverse sectional view of the same taken on vertical planes corresponding to line 3—3 of Figure 1;

Figure 4 is a rear view of a portion of the impact element and connected parts of the bumper;

Figure 5 is a detail top plan view of one of the members of a connecting link;

Figure 6 is a side view of the same;

Figure 7:
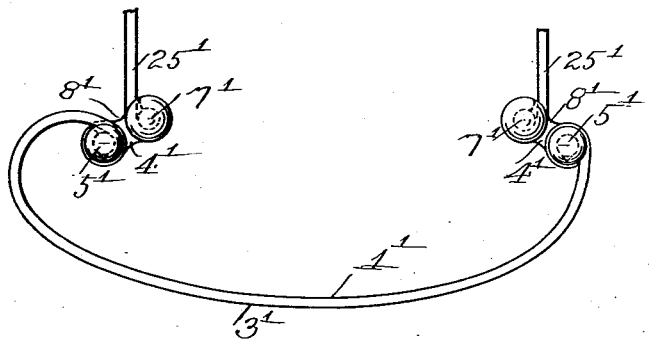
Figure 7 is a top plan view of a bumper particularly adapted to be mounted on the rear of the vehicle.
Figure 8:
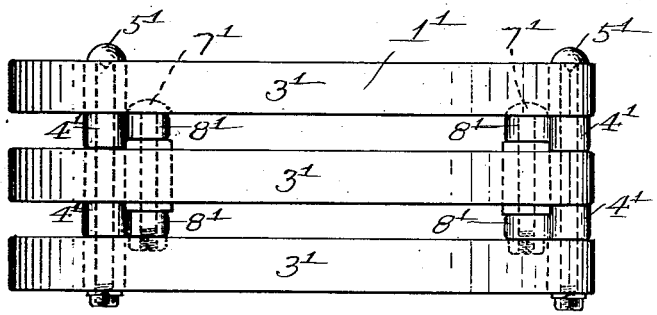
Figure 8 is a face view thereof.
Figure 9:
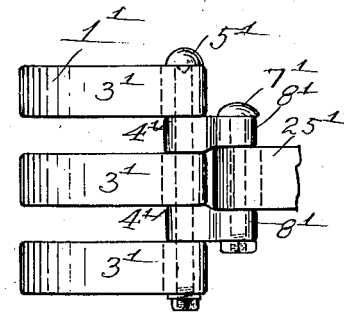
Figure 9 is an end view of the same.

In the constructions illustrated by the drawings, the bumper for vehicles (such as automobiles) is horizontally disposed and extends transversely of the vehicle, being carried at its front or rear end. The bumper comprises certain parts, all or some of which are resilient being formed of spring steel bars, viz:

An impact element, designated generally 1, adapted to receive thrusts from extraneous objects; and in the construction illustrated in Figures 1, 2, 3 and 4, a second element 2, intermediate the impact element and the vehicle, whereby the impact element in said views is supported. The impact element 1, as illustrated, comprises three bars 3, horizontally disposed parallelly and spaced apart vertically. Links, designated generally 4, are connected in all the views to the adjacent ends respectively of the bars 3 hingedly on vertical axes—the pintles 5. These links are connected to the vehicle (or to the bumper's mounting or supporting means 25 carried thereby, as seen in Figures 7, 8 and 9), or to the second element or bar 2 (as seen in other views) also hingedly on vertical axes—the pintles 7—these axes or pintles 5 and 7 being spaced apart as shown.

Each of these links in the construction illustrated comprises a pair of members 8 one (the upper) of which is connected to the impact element 1 between its uppermost and middle bar, and the other of which members is thus connected between said element's middle and lowermost bar.

A spring bar third element 12, in Figures 1, 2, 3 and 4, is connected at its middle portion to the middle of the second element 2 as by the clamp 10, and extends in either direction therefrom in curved form to its end portions which are connected to the impact element 1. This connection at each end of the third element 12 to the impact element 1 is effected by means of a clamp comprising a member 9 engaging the outer sides of the impact element's bars 3, and a second member 13 having recesses 14 in which the opposite sides of these bars are seated, this second clamp member having also another recess 15 in its opposite side in which an end of the third element 12 is held, the bottom of recess 15 being spaced inwardly from the bottom of the other recesses 14, i. e., toward the second element 2, so that the end of the third element 12 is held by the clamp in a vertical plane spaced inwardly from that in which the bars 3 are held. The bottom of this recess 15 thus forms a portion of clamp member 13 extending toward the element 2 further than the bars 3 extend. It will be seen that by this disposition, greater rigidity of the bumper against vertical thrusts received by the upper or lower edge of the impact element is provided. A bolt 16 passing through the members of the clamp and through the middle bar 3 and threaded to receive the nut 17, desirably provided with a spring washer 18 bearing on the third element 12, serves to securely connect the parts together. The ends of the third element 12 may be provided with elongated slots 19 through which this bolt passes, so that this element may slide on the clamp member 13 under the stress of an extremely violent thrust against the impact member 1.

The second element 2 and third element 12 are desirably wider vertically than any of the bars 3 of the impact member as shown.

Parts in Figures 7, 8 and 9 corresponding to parts in other views are designated by the same reference characters, with the prime mark added.

I claim:

1. In a bumper for vehicles: a horizontally disposed impact element; a horizontally disposed element intermediate the impact element and the vehicle; links connected to the adjacent ends respectively of said elements hingedly on vertical axes spaced apart; means for mounting the bumper on the vehicle, secured thereto and to the second-mentioned element; an element having a middle portion connected to the middle of the second-mentioned element and end portions connected to the impact element at points between the adjacent sides of the impact and second-mentioned elements.

2. In a bumper for vehicles: a horizontally disposed impact element; a horizontally disposed element intermediate the impact element and the vehicle; links connected to the adjacent ends respectively of said elements hingedly on vertical axes spaced apart; means for mounting the bumper on the vehicle, secured thereto and to the second-mentioned element; an element having a middle portion connected to the middle of the second-mentioned element and end portions longitudinally-slidably connected to the impact element at points between the adjacent sides of the impact and second-mentioned elements.

3. In a bumper for vehicles: an impact element comprising three bars horizontally disposed parallelly and spaced vertically; links connected to the adjacent ends respectively of said bars hingedly on vertical axes and connected to the vehicle on vertical axes spaced from the first-mentioned axes, each of the links comprising a pair of members respectively thus connected to the impact element between adjacent bars thereof.

4. In a bumper for vehicles: an impact element comprising bars horizontally disposed parallelly and spaced vertically; a horizontally disposed element intermediate the impact element and the vehicle and connected at its ends to the adjacent ends of the impact element; an element having a middle portion connected to the middle of the second-mentioned element; clamps each comprising a member engaging said bars, and a second member engaging the opposite sides thereof and having a portion extending from the bars toward the second-mentioned element, the ends of the third-mentioned element being connected to said portions of the second-mentioned members respectively of the clamps.

5. In a bumper for vehicles: an impact element comprising bars horizontally disposed parallelly and spaced vertically; a horizontally disposed element intermediate the impact element and the vehicle and connected at its ends to the adjacent ends of the impact element; an element having a middle portion connected to the middle of the second-mentioned element; clamps each comprising a member engaging said bars, and a second member having recesses in which the opposite sides of said bars are held and another recess in its opposite side in which an end of the third-mentioned element is held, the bottom of the last-mentioned recess being spaced from the bottom of the other recesses toward the second-mentioned element.

In testimony whereof I have hereunto set my hand at Grand Rapids, Michigan, this 6th day of March, 1925.

ALBERT P. CRELL.